(12) United States Patent
Almawashi

(10) Patent No.: US 11,654,871 B2
(45) Date of Patent: *May 23, 2023

(54) BUILT-IN VEHICLE JACK

(71) Applicant: Hayder Tahir Almawashi, Alexandria, VA (US)

(72) Inventor: Hayder Tahir Almawashi, Alexandria, VA (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/361,483

(22) Filed: Jun. 29, 2021

(65) Prior Publication Data

US 2021/0323511 A1     Oct. 21, 2021

Related U.S. Application Data

(63) Continuation of application No. 16/673,547, filed on Nov. 4, 2019, now Pat. No. 11,077,834.

(51) Int. Cl.
*B60S 9/10* (2006.01)

(52) U.S. Cl.
CPC ...................................... *B60S 9/10* (2013.01)

(58) Field of Classification Search
CPC ...... B66F 7/06; B60S 9/00; B60S 9/02; B60S 9/04; B60S 9/06
See application file for complete search history.

(56) References Cited

U.S. PATENT DOCUMENTS

| | | | |
|---|---|---|---|
| 8,752,675 B2 | 6/2014 | Berends | |
| 8,881,329 B2 | 11/2014 | Wolde | |
| 10,167,178 B2 | 1/2019 | Nebel | |
| 11,077,834 B2 * | 8/2021 | Almawashi | B60S 9/12 |
| 2012/0043515 A1 | 2/2012 | Finkbeiner et al. | |
| 2014/0217342 A1 | 8/2014 | Dondurur et al. | |
| 2017/0015285 A1 | 1/2017 | Nebel | |

FOREIGN PATENT DOCUMENTS

WO    WO 2013/062215    5/2013

OTHER PUBLICATIONS

English Language Abstract of WO/2013/062215 issued May 2, 2013.

* cited by examiner

*Primary Examiner* — Tyrone V Hall, Jr.
(74) *Attorney, Agent, or Firm* — DLA Piper LLP (US)

(57) ABSTRACT

A system for optimizing a machine learning model. a machine learning model that generates predictions based on at least one input feature vector, each input feature vector having one or more vector values; and an optimization module with a processor and an associated memory, the optimization module being configured to: create at least one slice of the predictions based on at least one vector value, determine at least one optimization metric of the slice that is based on at least a total number of predictions for the vector value, and optimize the machine learning model based on the optimization metric.

19 Claims, 7 Drawing Sheets

US 11,654,871 B2

BUILT-IN VEHICLE JACK

CROSS-REFERENCE TO RELATED APPLICATIONS

This application is a continuation application of U.S. application Ser. No. 16/673,547, filed Nov. 4, 2019. The content of which is incorporated herein by reference in its entirety.

FIELD

The present application relates to a device that comprises a vehicle jack system that can be built-into into an automobile frame as a permanent accessory at the factory.

BACKGROUND

When a person driving a passenger car or truck gets a flat tire, they either have to use the manufacturer-provided tire jack and lug wrench. Or, if a driver has roadside assistance through their auto insurance or a separate plan, such as AAA, they have to call and wait for a tow truck or roadside assistance vendor to show up. This can take anywhere from 30 minutes to 3 hours, depending on location and time of day. People are busier than ever and the sooner that a driver can get a tired change and get back on the road, the better. Currently, no passenger automobile or truck comes with a built-in jack to allow a tire change without assistance or using the sometimes inadequate for uneven surfaces jack that cars come equipped with in their trunks. As a result, owners of automobiles are usually forced to call roadside assistance and have to wait until their help arrives.

BRIEF SUMMARY

Disclosed is a built-in tire jack system that uses a vehicle's interface to hydraulic actuate lift arms to enable a driver to change a tire quickly and without the need to wait for assistance. Exemplary features of the invention include the ability to activate a single lift arm or a pair on either side of the vehicle near any of the four tires of a vehicle. The control system will either run through a vehicle's digital command center, if it has one or through switches on the dashboard.

On each side of the vehicle, there are a set of lift arms by each tire. Through the control system, one or both arms on either side are activated hydraulically.

When one or both arms on a side are activated, the hydraulic system provides pressure to them that initiates a movement in the two-arm assembly, causing it swing down towards the ground and then having the jack extend from the arm closest to the tire being jacked or both tires.

Further objects, features, advantages and properties of the system, according to the present application will become more apparent from the detailed description.

It is not convenient for the average driver to carry a high quality-high capacity jack in the trunk of a car due to the size, weight and space requirements. Additionally, many drivers are not comfortable using the small, manual scissor jacks that often accompany passenger vehicles, especially in less than ideal circumstances. If a car came with a tire jack system already built into the frame, it would be much easier for men or women to change a tire themselves and do so quickly. This is especially useful when a flat tire occurs in hot or inclement weather, unfamiliar neighborhoods, in desolate/between locations or during rush hour, late night or the small hours after midnight.

BRIEF DESCRIPTION OF THE SEVERAL VIEWS OF THE DRAWING

In the drawings, which form a part of this specification.

DETAILED DESCRIPTION

In the following detailed description, the built-in tire jack system (also referred as the "system") for this application will be described by the embodiments.

Figure 1:
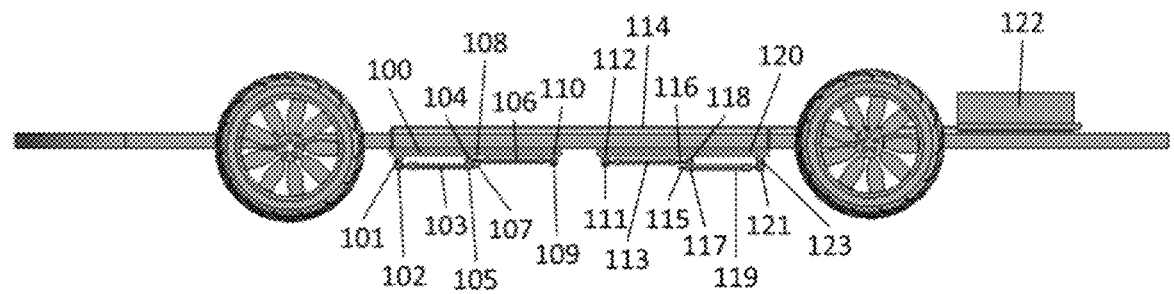
FIG. 1 is a side elevation showing the built-in jack system at rest, including the hydraulic pump/tank and lines.

The system is illustrated in FIG. 1. The figure presents a side elevation of a vehicle frame and tires with system components showing. The system begins with the hydraulic arm bar frame 100 that is attached to the bottom of the vehicle frame. Attached to the hydraulic arm bar frame 100 is the front forward fulcrum protrusion, e.g., pivot joint 101 that the front tire jack arm 103 is attached to fulcrum axle 102. The first front tire jack arm 103 is connected to the front tire jack extension case 106 by a pivot joint 105 and front tire jack extension bar 108. A second front tire jack arm includes the tire jack extension case 106 and the front tire jack extension bar 108. The pivot joint 105 has a front tire jack arm fulcrum axle 104 attached between the front tire jack arm 103 and the front tire jack extension case 106.

As the front tire jack arm 103 begins to hydraulically actuate, the front tire jack extension bar 108 extends from the front tire jack extension case 106, connected by the front tire jack arm fulcrum axle 104. Concurrently, the front tire jack extension case 106 rotates about fulcrum axle 109 that is contained within the front backward fulcrum protrusion, e.g., pivot joint 110. When the front tire jack arm 103 is perpendicular to the ground, the front tire jack 107 extends down, lifting the vehicle off of the ground. Note that the distance between pivot joint 101 and pivot joint 110 is fixed. Also, this distance is less than a sum of the length of the front tire jack arm 103 and the sum of the lengths of the front tire jack extension case 106 and the front tire jack extension bar 108 when the jack is fully extended toward the ground.

The system continues with the hydraulic arm bar frame 120, which has the rear backward fulcrum protrusion, e.g., pivot joint 123 that the rear tire jack arm 119 is attached to fulcrum axle 121. The rear tire jack arm 119 is connected to the rear tire jack extension case 113 by a pivot joint 117. The pivot joint 117 has a rear tire jack arm fulcrum axle 118 attached between the rear tire jack arm 119 and the rear tire jack extension case 113.

As the rear tire jack bar 119 begins to hydraulically actuate, the rear tire jack extension bar 116 extends from the rear tire jack extension case 113, connected by the rear tire jack arm fulcrum axle 118. Concurrently, the rear tire jack extension case 113 rotates about fulcrum axle 111 that is contained within the rear forward fulcrum protrusion, e.g., pivot joint 112. When the rear tire jack arm 119 is perpendicular to the ground, the rear tire jack 115 extends down, lifting the vehicle off of the ground.

The dual hydraulic pumps and tanks 122 transfer force to the jack arms, independently or in tandem, through the hydraulic lines 114.

Figure 2:
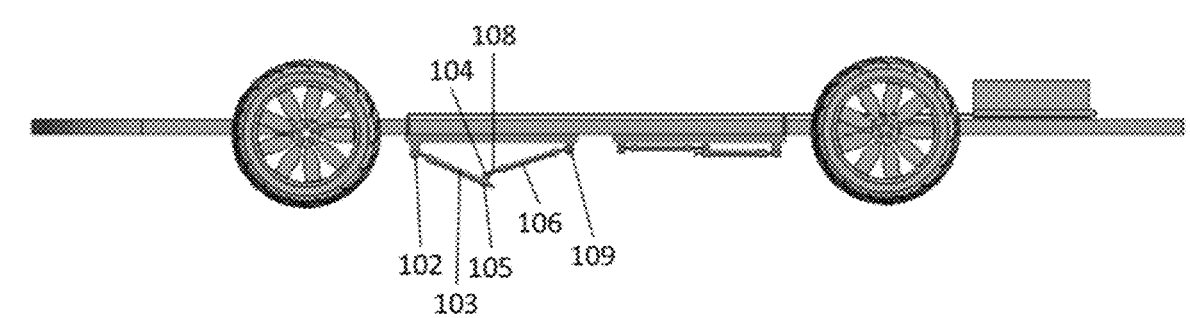
FIG. 2 is a side elevation view of the initial front jack arm deployment.

FIG. 2 presents that same side elevation from FIG. 1, showing how the front tire jack would start to deploy. An electric motor in the fulcrum axle 102 causes the front tire jack arm 103 to rotate downward, mechanically pulling the front tire jack extension bar 108 out of the front tire extension case 106 by a small distance to get it rotating about fulcrum axle 109, which is connected to pivot joint 105 through the front tire jack arm fulcrum axle 104.

Figure 3:
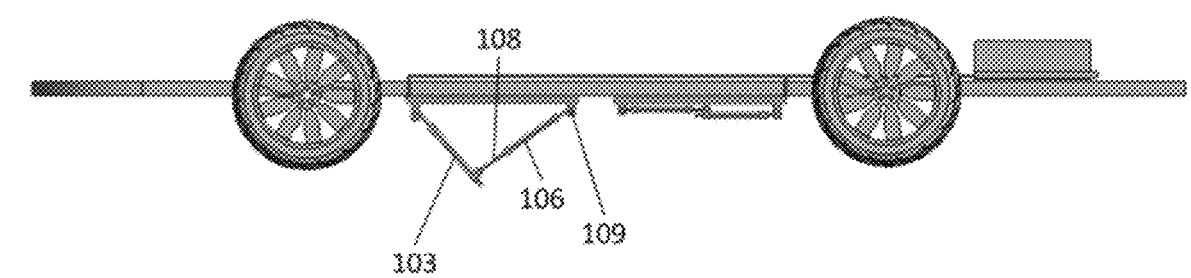
FIG. 3 is a side elevation view of the front jack arm extending down from the vehicle frame.

FIG. 3 presents that same side elevation from FIG. 2, showing the extension of the jack leg towards the ground. The front tire jack extension bar 108 begins to hydraulically extend further from the front tire extension case 106, rotating about fulcrum axle 109, causing the front tire jack arm 103 to swing downward further.

Figure 4:
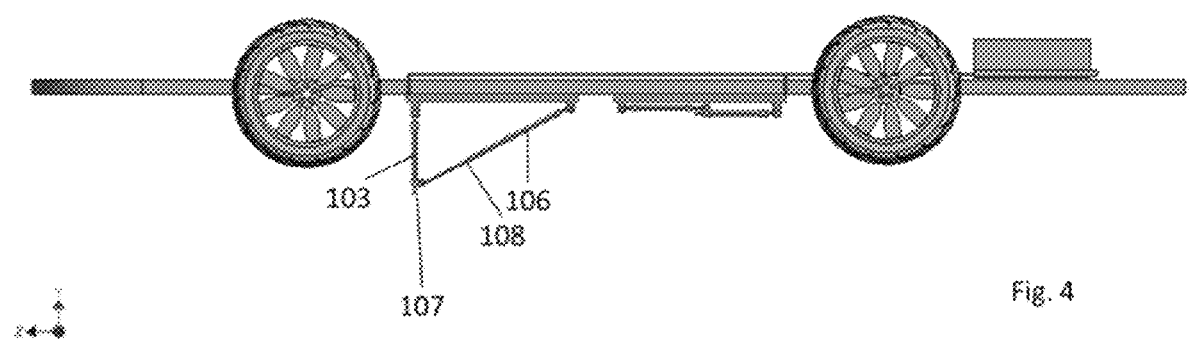
FIG. 4 is a side elevation view of the front jack arm extending perpendicular to the ground.

FIG. 4 presents the same side elevation from FIG. 3, showing the jack arm being extended perpendicular to the ground. When fully extended from the front tire extension case 106, the front tire jack extension bar 108 has the front tire jack arm 103 perpendicular or close to perpendicular to the ground. The front tire jack 107 and its footing will be pointing at the surface for the last stage of the lifting process.

Figure 5:
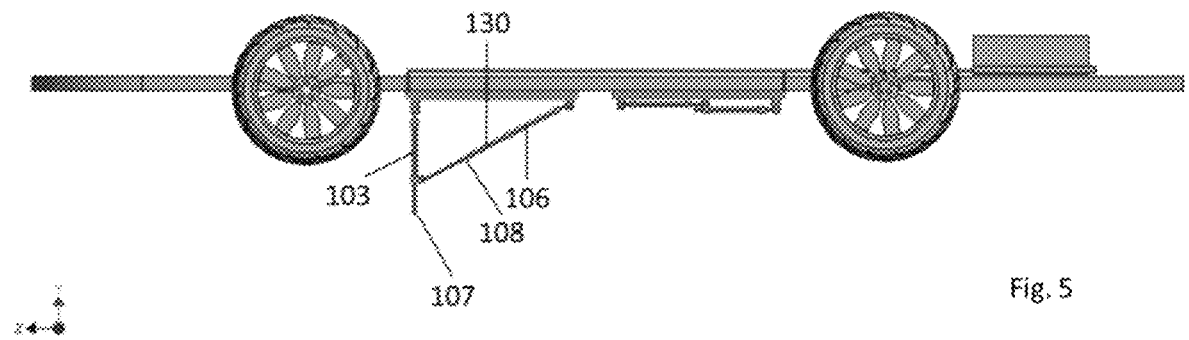
FIG. 5 is a side elevation view of the internal front jack extending perpendicular to the ground to lift a vehicle off of the ground.

FIG. 5 presents the same side elevation from FIG. 4, showing the jack being extended from the jack arm, providing lift to the vehicle. As the front tire jack extension bar 108 continues to come out of the front tire extension case 106, an inner extension sleeve 130 also comes out of the front tire extension case 106 until they and the front tire jack arm 103 are locked into the approximately perpendicular position to the ground and the front tire jack 107 extends to the ground and lifts the vehicle until an inflated tire would be approximately 3 inches off of the ground, depending on the vehicle model.

Figure 6:
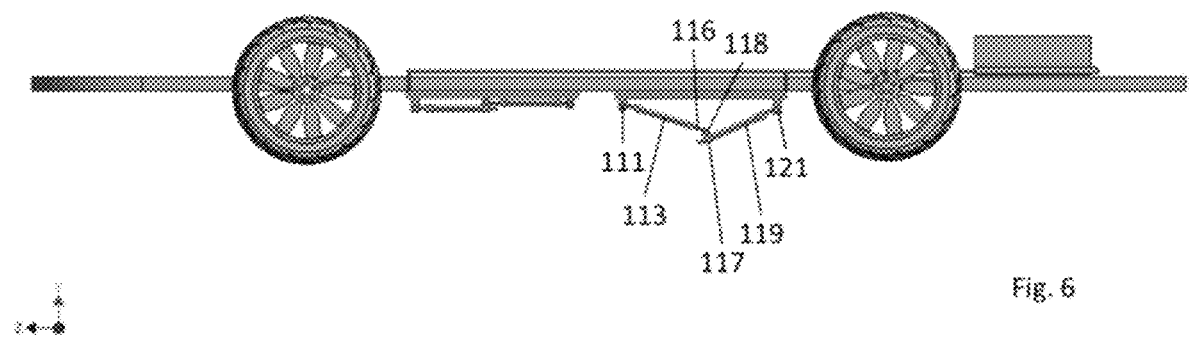
FIG. 6 is a side elevation view of the initial rear jack arm deployment.

FIG. 6 presents that same side elevation from FIG. 1, showing how the rear tire jack would start to deploy. An electric motor in the fulcrum axle 121 causes the rear tire jack arm 119 to rotate downward, mechanically pulling the rear tire jack extension bar 116 out of the rear tire extension case 113 by a small distance to get it rotating about fulcrum axle 111, which is connected to the pivot joint 117 through the rear tire jack arm fulcrum axle 118.

Figure 7:
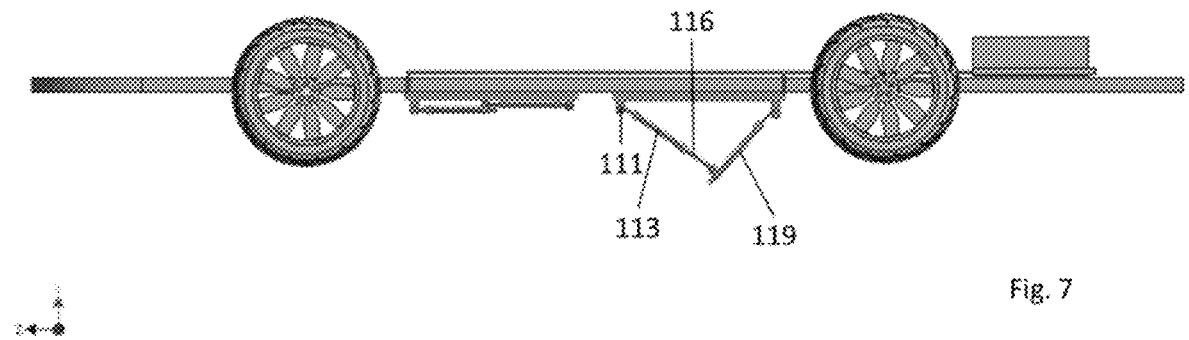
FIG. 7 is a side elevation view of the rear jack arm extending down from the vehicle frame.

FIG. 7 presents that same side elevation from FIG. 6, showing the extension of the jack leg towards the ground. The rear tire jack extension bar 116 begins to hydraulically extend further from the rear tire extension case 113, rotating about fulcrum axle 111, causing the rear tire jack arm 119 to swing downward further.

Figure 8:
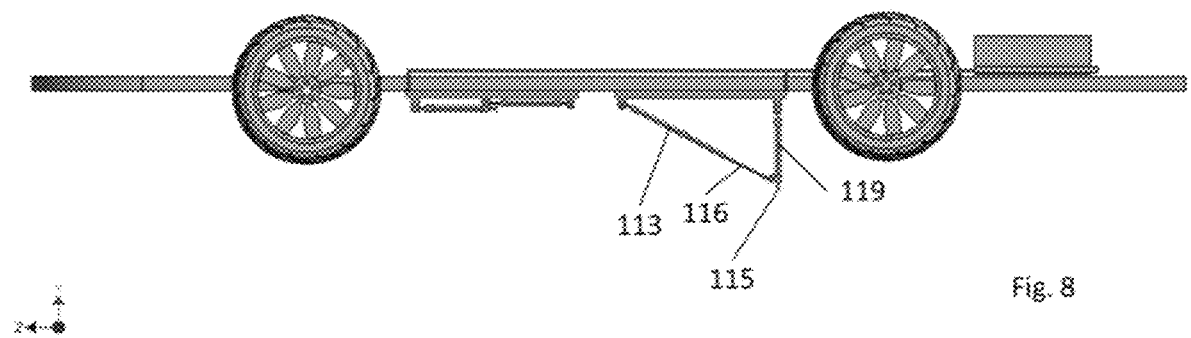
FIG. 8 is a side elevation view of the rear jack arm extending perpendicular to the ground.

FIG. 8 presents the same side elevation from FIG. 7, showing the jack arm being extended perpendicular to the ground. When fully extended from the rear tire extension case 113, the rear tire jack extension bar 116 has the rear tire jack arm 119 perpendicular or close to perpendicular to the ground. The rear tire jack 115 and its footing will be pointing at the surface for the last stage of the lifting process.

Figure 9:
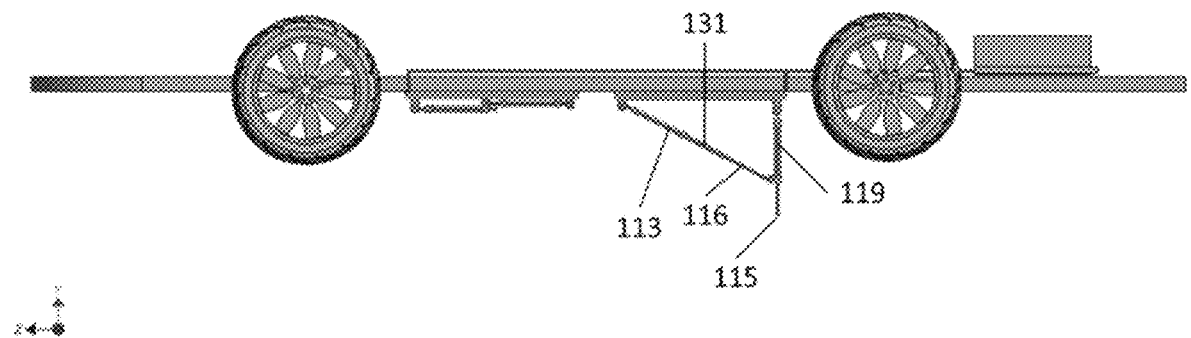
FIG. 9 is a side elevation view of the internal rear jack extending perpendicular to the ground to lift a vehicle off of the ground.

FIG. 9 presents the same side elevation from FIG. 8, showing the jack being extended from the jack arm, providing lift to the vehicle. As the rear tire jack extension bar 116 continues to come out of the rear tire extension case 113, an inner extension sleeve 131 also comes out of the rear tire extension case 113 until they and the rear tire jack arm 119 are locked into the approximately perpendicular position to the ground and the rear tire jack 115 extends to the ground and lifts the vehicle until an inflated tire would be approximately 3 inches off of the ground, depending on the vehicle model.

Figure 10:
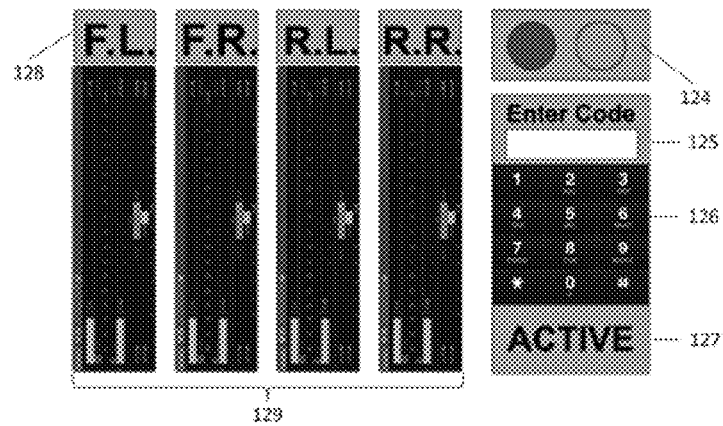
FIG. 10 is a front view of the security pad, pump selection buttons and pump status indicators.

FIG. 10 shows the display and control for the built-in jack system. The top of the control pad has power indicator lights 124 to indicate whether the system is on or not. Users will have to enter a code on security pad 126 that shows in the code display 125. The control also has a system status indicator 127 that uses text to let the user know when the system is ready and permitted to be activated. Once active, the user may select up to 2 complimentary jack actions from the activation buttons 128—an individual jack, two on the same side, the two front jacks or the two rear jacks. So that the user knows what is going on at all times, they can view the status of the jacks in the jack position and force display 129.

Figure 11:
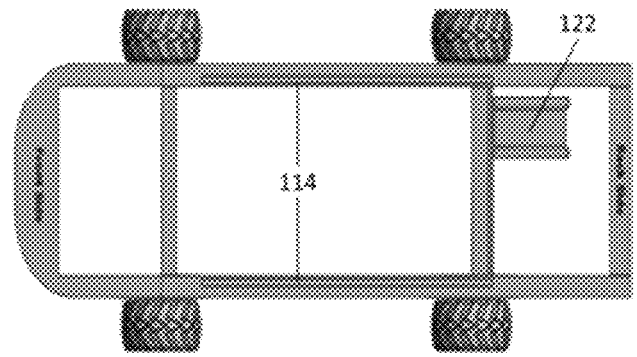
FIG. 11 is an overhead view of the system, showing the hydraulic pump/tank and lines.

FIG. 11 is an overhead view of the hydraulic system with dual hydraulic pumps and tanks 122 in the trunk transferring force through the hydraulic lines 114 to the various jack positions.

Figure 12:
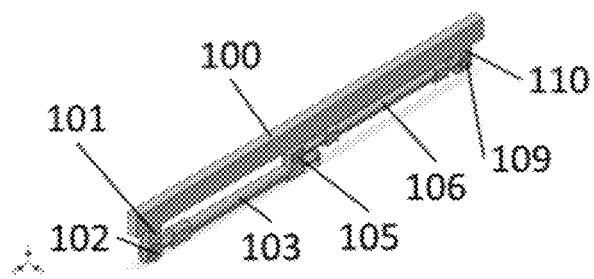
FIG. 12 is an angled side elevation view of the front jack attached and its frame bar.

FIG. 12 is a separate angled view of the front tire jack system at rest, as shown in FIG. 1.

Figure 13:
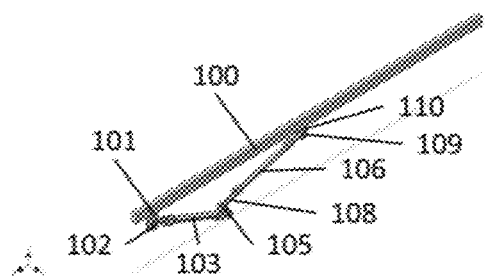
FIG. 13 is an angled side elevation view of the initial front jack arm deployment.

FIG. 13 is a separate angled view of the initial front jack arm deployment, as shown in FIG. 2.

Figure 14:
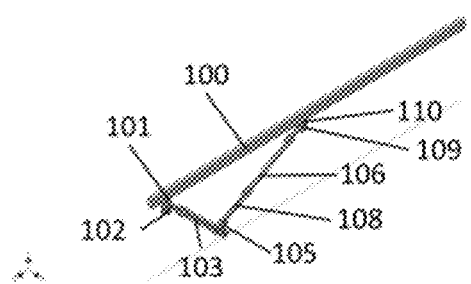
FIG. 14 is an angled side elevation view of the front jack arm extending down from the vehicle frame.

FIG. 14 is a separate angled view of the front jack arm extending down from the vehicle frame, as shown in FIG. 3.

Figure 15:
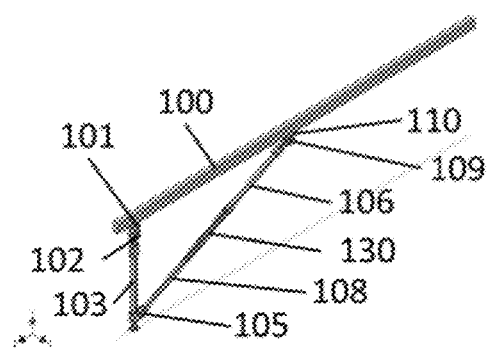
FIG. 15 is an angled side elevation view of the front jack arm extending perpendicular to the ground.

FIG. 15 is a separate angled view of the front jack arm extending perpendicular to the ground, as shown in FIG. 4.

Figure 16:
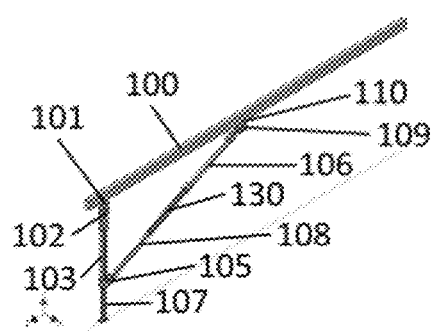
FIG. 16 is an angled side elevation view of the internal front jack extending perpendicular to the ground to lift a vehicle off of the ground.

FIG. 16 is a separate angled view of the internal front jack extending perpendicular to the ground to lift a vehicle off of the ground, as shown in FIG. 5.

Figure 17:
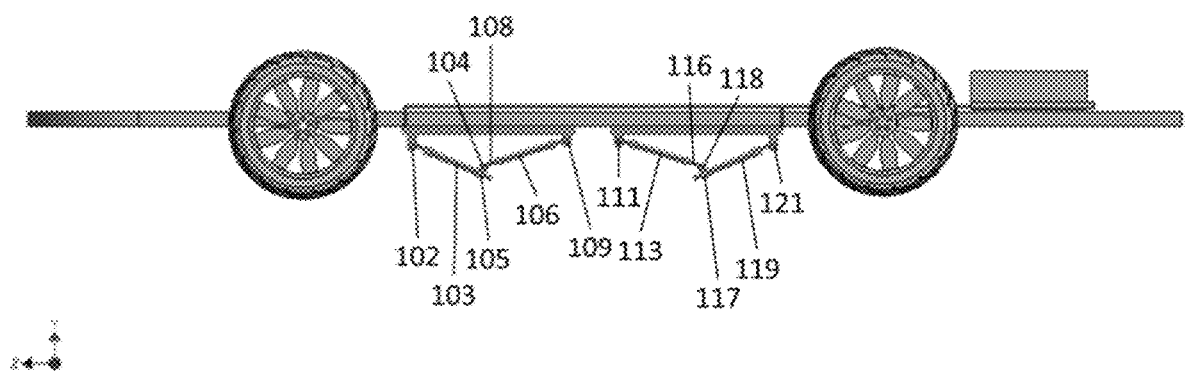
FIG. 17 is a side elevation of the initial jack arm deployment for both jacks on one side of a vehicle.

FIG. 17 is a side elevation showing the initial jack arm deployment for both jacks on one side of a vehicle.

Figure 18:
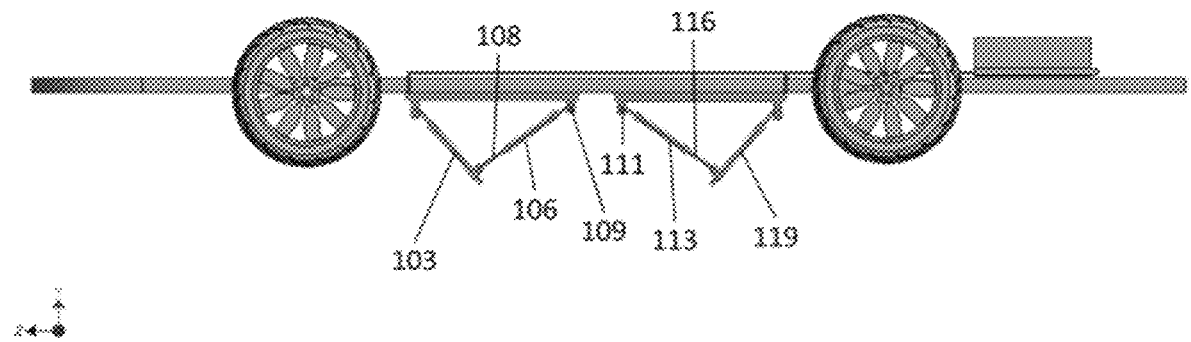
FIG. 18 is a side elevation view of the front and rear jack arm extending down from the vehicle frame.

FIG. 18 is a side elevation showing the front and rear jack arm extending down from the vehicle frame on one side of a vehicle.

Figure 19:
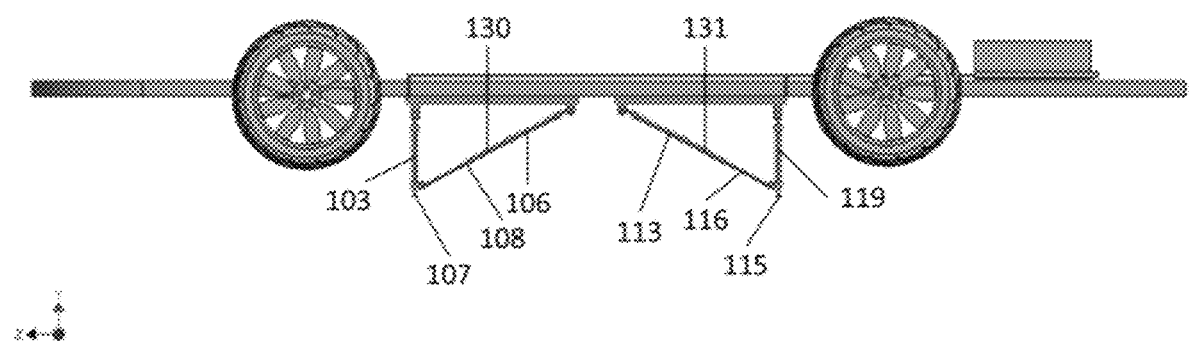
FIG. 19 is a side elevation view of the front and rear jack arm extending perpendicular to the ground.

FIG. 19 is a side elevation showing the front and rear jack arm extending perpendicular to the ground on one side of a vehicle.

Figure 20:
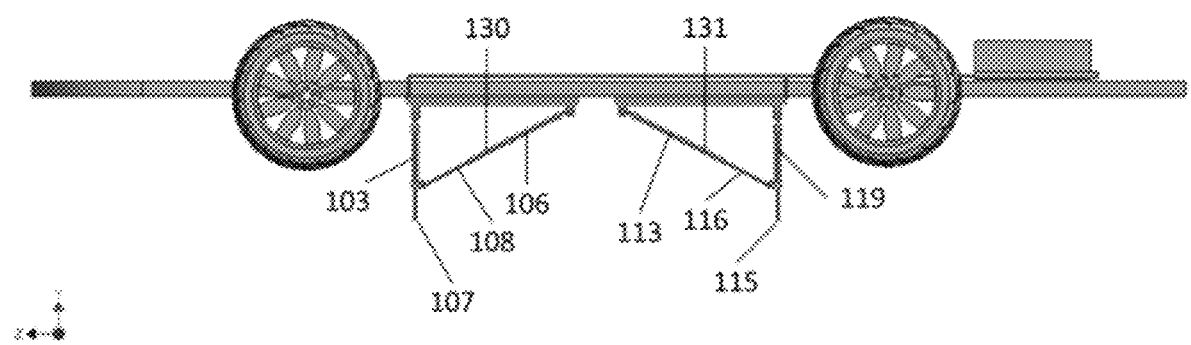
FIG. 20 is a side elevation view of the internal front and rear jacks extending perpendicular to the ground to lift a vehicle off of the ground.

FIG. 20 is a side elevation showing the internal front and rear jacks extending perpendicular to the ground to lift a vehicle off of the ground on one side of a vehicle.

The invention claimed is:

1. A lifting mechanism, comprising:
a hydraulic arm bar frame attached to a frame of a vehicle and extending parallel to a longitudinal axis of the frame of the vehicle;
a first jack arm and a first pivot joint, the first pivot joint pivotably connecting one end of the first jack arm to the hydraulic arm bar frame; and
a second jack arm, a second pivot joint, and a third pivot joint, the second pivot joint pivotably connecting one end of the second jack arm to the hydraulic arm bar frame, and the third pivot joint pivotably connecting another end of the second jack arm to another end of the first jack arm, wherein the second jack arm includes a jack extension case and a jack extension bar that is slidably disposed within the jack extension case, the jack extension bar extending from and withdrawing within the jack extension case in response to increasing and decreasing hydraulic pressure, respectively, wherein the jack extension bar extends from the jack extension case in response to increasing hydraulic pressure, causing the first jack arm to pivot toward the ground and lift the nearby wheel off of the ground, wherein
a distance between the first pivot joint and the second pivot joint is fixed and the distance is less than a sum of a length of the first arm bar and a length of the second arm bar when the jack extension bar is fully extended from the jack extension case.

2. The lifting mechanism according to claim 1, wherein the jack extension case lies prostrate to the hydraulic arm bar frame.

3. The lifting mechanism according to claim 1, wherein the first jack arm lies prostrate, parallel to the jack extension case.

4. The lifting mechanism according to claim 1, wherein the jack extension case is hydraulically coupled to at least one hydraulic pump.

5. The lifting mechanism according to claim 4, wherein the jack extension case is hydraulically coupled to at least one hydraulic pump via at least one hydraulic line.

6. The lifting mechanism according to claim 5, wherein a control system is configured to control the hydraulic pump to control pressure along the hydraulic line and control pressure in the jack extension case.

7. The lifting mechanism according to claim 6, wherein the control system includes a security pad that requires a code.

8. The lifting mechanism according to claim 5, wherein the at least one hydraulic line includes two hydraulic lines.

9. The lifting mechanism according to claim 6, wherein the control system includes a plurality of activation buttons that control the lifting mechanism.

10. The lifting mechanism according to claim 4, wherein the at least one hydraulic pump is disposed in a trunk of the vehicle.

11. The lifting mechanism according to claim 4, wherein the at least one hydraulic pump includes two hydraulic pumps.

12. The lifting mechanism according to claim 1, comprising at least two separate lifting mechanisms that are operated at the same time.

13. The lifting mechanism according to claim 12, wherein the control system includes a system status indicator that shows which lifting mechanisms are in operation.

14. The lifting mechanism according to claim 13, wherein the system status indicator is integrated into a display system of the vehicle.

15. The lifting mechanism according to claim 1, wherein the first jack arm includes a flat plate that extends to the ground when the vehicle is lifted above of the ground.

16. The lifting mechanism according to claim 1, comprising four separate lifting mechanisms.

17. The lifting mechanism according to claim 1, wherein a first lifting mechanism is disposed of near a front wheel of the vehicle and a second lifting mechanism is disposed of near a rear wheel of the vehicle.

18. The lifting mechanism according to claim 1, wherein the vehicle is an automobile.

19. The lifting mechanism according to claim 1, wherein the lifting mechanism is disposed near a wheel of the vehicle.

* * * * *

UNITED STATES PATENT AND TRADEMARK OFFICE
CERTIFICATE OF CORRECTION

| | | |
|---|---|---|
| PATENT NO. | : 11,654,871 B2 | Page 1 of 1 |
| APPLICATION NO. | : 17/361483 | |
| DATED | : May 23, 2023 | |
| INVENTOR(S) | : Hayder Tahir Almawashi | |

It is certified that error appears in the above-identified patent and that said Letters Patent is hereby corrected as shown below:

On the Title Page

Item (57) the Abstract, Lines 1-10, delete:
"A system for optimizing a machine learning model. a machine learning model that generates predictions based on at least one input feature vector, each input feature vector having one or more vector values; and an optimization module with a processor and an associated memory, the optimization module being configured to: create at least one slice of the predictions based on at least one vector value, determine at least one optimization metric of the slice that is based on at least a total number of predictions for the vector value, and optimize the machine learning model based on the optimization metric."

Insert:
--A hydraulic system that activates and operates a built-in jack system to enable a driver to change their tires without needing to set up a manual jack system, especially in inclement weather or in a poorly known location. The system is made up of four hydraulic jacks located closely to each tire. A hydraulic pump activated and operated from a control panel will enable one or more of the jacks to actuate due to the hydraulic fluid, lifting the vehicle off of the ground high enough to change a tire.--

Signed and Sealed this
Nineteenth Day of March, 2024

*Katherine Kelly Vidal*

Katherine Kelly Vidal
*Director of the United States Patent and Trademark Office*